US008086237B2

(12) United States Patent
Vela et al.

(10) Patent No.: US 8,086,237 B2
(45) Date of Patent: Dec. 27, 2011

(54) EFFICIENT NEIGHBOR LIST CREATION FOR CELLULAR NETWORKS

(75) Inventors: Mario Vela, Portland, ME (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 1032 days.

(21) Appl. No.: 11/968,023

(22) Filed: Dec. 31, 2007

(65) Prior Publication Data

US 2009/0124262 A1 May 14, 2009

(51) Int. Cl.
*H04W 4/00* (2009.01)
(52) U.S. Cl. ........ 455/442; 455/433; 455/436; 455/440; 455/452.2; 455/566
(58) Field of Classification Search .................. 455/566, 455/432.1, 433, 440, 436, 452.2, 442
See application file for complete search history.

(56) References Cited

U.S. PATENT DOCUMENTS

| | | | |
|---|---|---|---|
| 7,941,148 B2* | 5/2011 | Roskowski et al. | 455/436 |
| 2004/0142699 A1* | 7/2004 | Jollota et al. | 455/452.2 |

* cited by examiner

*Primary Examiner* — Pierre-Louis Desir
(74) *Attorney, Agent, or Firm* — Leydig, Voit & Mayer, Ltd.

(57) ABSTRACT

A method of constructing a neighbor list for a plurality of sectors in a cellular communication environment sorts reference neighbor pairs in the network by number of occurrences based on data derived from one or more PSMM transmissions, analyzes pairs in the sorted list and determines for each pair whether a percentage of occurrence exceeds a first threshold and whether a measure of direct transition statistics exceeds a second threshold. If the percentage of occurrence exceeds a first threshold and the measure of direct transition statistics exceeds a second threshold, then if the reference's neighbor list and reciprocal neighbor list have fewer than a predetermined number of neighbors, the process adds neighbors to the reference's NL and reciprocal NL in order of occurrence percentage to create a final neighbor list.

20 Claims, 11 Drawing Sheets

| SECTOR 111 MODIFIED NEIGHBOR LIST ||
|---|---|
| SECTOR | NEIGHBOR |
| 111 | 109 |
| 111 | 110 |
| 111 | 115 |
| 111 | 119 |
| 111 | 118 |
| 111 | 107 |
| 111 | 120 |

*FIG. 3*

| FREQ-SITE-SECTOR | Recommended SWN | SW0 | SW1 | SW2 | SW3 | SW4 | SW5 | SW6 | SW7 | SW8 | SW9 | SW10 | SW11 | SW12 | SW13 | SW14 | SW15 | Total_Counts |
|---|---|---|---|---|---|---|---|---|---|---|---|---|---|---|---|---|---|---|
| 157-1506-1 | 10 | 20 | 4 | | | | | | | | 2 | 3 | | | | | | 33 |
| 157-1506-2 | 8 | 14 | | | | | | 3 | 14 | 23 | | | | | | | | 74 |
| 157-1506-3 | 10 | 19 | 3 | 1 | 2 | 3 | 12 | 6 | 8 | 2 | 1 | 3 | | | | | | 60 |
| 157-1507-1 | 8 | 30 | 1 | 7 | 1 | 8 | 12 | 10 | 4 | 6 | 1 | | | | | | | 81 |
| 157-1507-2 | 10 | 32 | 5 | 1 | 7 | 2 | 0 | 5 | 9 | 14 | 5 | 2 | | | | | | 97 |
| 157-1507-3 | 9 | 117 | 17 | 9 | 1 | 7 | 17 | 8 | 30 | 20 | 6 | | | | | | | 248 |
| 157-1508-1 | 10 | 15 | | | 5 | | | 19 | | | 1 | 4 | | | | | | 20 |
| 157-1508-2 | 11 | 3 | | | | 2 | | | | | | | 2 | | | | | 7 |
| 157-1508-3 | 10 | 17 | 4 | | 1 | 2 | | 2 | 1 | 1 | 2 | 2 | | | | | | 31 |
| 157-1510-1 | 9 | 34 | 3 | 3 | 3 | 13 | 8 | 29 | 2 | 2 | 7 | | | | | | | 99 |
| 157-1510-2 | 7 | 74 | 11 | 17 | 6 | 10 | 25 | 7 | 5 | | | | | | | | | 143 |
| 157-1510-3 | 8 | 148 | 6 | 6 | 11 | 66 | 74 | 32 | 49 | 45 | 9 | | | | | | | 458 |
| 157-1512-1 | 9 | 58 | | 9 | 13 | 27 | 30 | 26 | 5 | 25 | 7 | | | | | | | 198 |
| 157-1512-2 | 9 | 70 | 8 | 2 | 11 | 45 | 64 | 46 | 110 | 44 | 31 | 1 | | | 1 | | | 438 |
| 157-1512-3 | 8 | 55 | 2 | 5 | | 17 | 22 | 2 | 8 | 22 | 2 | | | | | | | 132 |
| 157-1515-1 | 4 | 13 | 1 | 10 | 2 | 3 | 5 | | | | | | | | | | | 24 |
| 157-1515-2 | 10 | 1 | | | 1 | 63 | | 30 | | | | 3 | | | | | | 113 |

*FIG. 4*

| Reference Sector | PN_REF | Neighbor | PN_NEIGH | Occurrences | Occurrence% | DirectTrans | Recip. Occur | Recip. Occur% | Reciprocal DirecTrans |
|---|---|---|---|---|---|---|---|---|---|
| 157-1506-1 | 80 | 157-1506-2 | 232 | 6 | 21.43% | 0 | 2 | 40.00% | 0 |
| 157-1506-1 | 80 | 157-1506-2 | 248 | 6 | 21.43% | 2 | 2 | 3.08% | 0 |
| 157-1506-1 | 80 | 157-1506-3 | 400 | 5 | 17.86% | 0 | 2 | 7.41% | 1 |
| 157-1506-1 | 80 | 157-1507-1 | 112 | 4 | 14.29% | 0 | 0 | 0.00% | 0 |
| 157-1506-1 | 80 | 157-1515-2 | 240 | 3 | 10.71% | 1 | 22 | 23.16% | 1 |
| 157-1506-1 | 80 | 157-1506-3 | 416 | 3 | 10.71% | 0 | 10 | 20.00% | 0 |
| 157-1506-1 | 80 | 157-1650-2 | 256 | 1 | 3.57% | 0 | 0 | 0.00% | 0 |
| 157-1506-2 | 248 | 157-1653-3 | 432 | 22 | 33.85% | 2 | 2 | 1.21% | 0 |
| 157-1506-2 | 248 | 157-1507-1 | 112 | 22 | 33.85% | 1 | 2 | 2.94% | 0 |
| 157-1506-2 | 248 | 157-1650-2 | 256 | 5 | 7.69% | 0 | 0 | 0.00% | 0 |
| 157-1506-2 | 248 | 157-1506-3 | 416 | 5 | 7.69% | 0 | 1 | 2.00% | 0 |
| 157-1506-2 | 248 | 157-1510-2 | 272 | 2 | 3.08% | 0 | 0 | 0.00% | 0 |
| 157-1506-2 | 248 | 157-1506-1 | 80 | 2 | 3.08% | 0 | 6 | 21.43% | 2 |
| 157-1506-2 | 248 | 157-1507-2 | 280 | 2 | 3.08% | 0 | 5 | 7.14% | 0 |
| 157-1506-2 | 248 | 157-1653-2 | 264 | 2 | 3.08% | 2 | 2 | 0.89% | 0 |
| 157-1506-2 | 248 | 157-1510-1 | 104 | 1 | 1.54% | 0 | 0 | 0.00% | 0 |
| 157-1506-2 | 248 | 157-1676-2 | 236 | 18 | 36.00% | 1 | 0 | 0.00% | 0 |
| 157-1506-3 | 416 | 157-1650-2 | 256 | 16 | 32.00% | 0 | 4 | 33.33% | 4 |
| 157-1506-3 | 416 | 157-1508-3 | 400 | 10 | 20.00% | 0 | 4 | 14.81% | 0 |
| 157-1506-3 | 416 | 157-1506-1 | 80 | 2 | 4.00% | 0 | 3 | 10.71% | 1 |
| 157-1506-3 | 416 | 157-1650-1 | 88 | 2 | 4.00% | 0 | 15 | 25.86% | 2 |
| 157-1506-3 | 416 | 157-1652-1 | 128 | 1 | 2.00% | 0 | 0 | 0.00% | 0 |
| 157-1506-3 | 416 | 157-1507-1 | 112 | 1 | 2.00% | 0 | 0 | 0.00% | 0 |
| 157-1506-3 | 416 | 157-1506-2 | 248 | 1 | 2.00% | 0 | 5 | 7.69% | 0 |

*FIG. 5*

| Reference Sector | MAX REF Eclo | AVG REF Eclo | MIN REF Eclo | MAX NEIGH Eclo | AVG NEIGH Eclo | MIN NEIGH Eclo | MAX Delta Eclo | AVG Delta Eclo | MIN Delta Eclo |
|---|---|---|---|---|---|---|---|---|---|
| 157-1506-1 | -4.5 | -7.75 | -10 | -6.5 | -11.5 | -16.5 | 12 | 3.75 | -3.5 |
| 157-1506-1 | -5 | -8.25 | -17 | -4 | -11 | -20 | 11.5 | 2.75 | -13 |
| 157-1506-1 | -7.5 | -8.4 | -10 | -12 | -13.7 | -15 | 7.5 | 5.3 | 3.5 |
| 157-1506-1 | -6 | -7.5 | -9 | -12 | -12.5 | -13 | 7 | 5 | 3.5 |
| 157-1506-1 | -7.5 | -8.33 | -10 | -13.5 | -13.83 | -14 | 6.5 | 5.5 | 3.5 |
| 157-1506-1 | -3.5 | -5.67 | -8.5 | -6.5 | -10.57 | -13.5 | 10 | 5 | -2 |
| 157-1506-1 | -8.5 | -8.5 | -8.5 | -12.5 | -12.5 | -12.5 | 4 | 4 | 4 |
| 157-1506-2 | -3 | -6.95 | -16 | -7.5 | -15.25 | -22 | 19 | 8.3 | -8.5 |
| 157-1506-2 | -3 | -6.86 | -16 | -10.5 | -16.93 | -22 | 18.5 | 10.07 | -3.5 |
| 157-1506-2 | -4 | -5.8 | -10.5 | -12.5 | -15.5 | -19.5 | 15 | 9.7 | 2 |
| 157-1506-2 | -5 | -7.4 | -11.5 | -13 | -14.5 | -17 | 12 | 7.1 | 2.5 |
| 157-1506-2 | -10.5 | -10.75 | -11 | -16.5 | -16.5 | -16.5 | 6 | 5.75 | 5.5 |
| 157-1506-2 | -9.5 | -10.5 | -11.5 | -5 | -6 | -7 | -2.5 | -4.5 | -6.5 |
| 157-1506-2 | -6.5 | -8.75 | -11 | -14.5 | -14.75 | -15 | 8.5 | 6 | 3.5 |
| 157-1506-2 | -10.5 | -10.75 | -11 | -9.5 | -9.75 | -10 | -1 | -1 | -1 |
| 157-1506-2 | -10.5 | -10.75 | -11 | -14 | -14 | -14 | 3.5 | 3.25 | 3 |
| 157-1506-2 | -6.5 | -6.5 | -6.5 | -20.5 | -20.5 | -20.5 | 14 | 14 | 14 |
| 157-1506-3 | -6 | -9.53 | -15.5 | -7.5 | -12.53 | -21 | 11 | 3 | -5 |
| 157-1506-3 | -6.5 | -8.84 | -12.5 | -11.5 | -16.03 | -26 | 16.5 | 7.19 | 1.5 |
| 157-1506-3 | -5 | -8.45 | -12.5 | -5.5 | -13.2 | -16.5 | 9.5 | 4.75 | -1.5 |
| 157-1506-3 | -15 | -15.25 | -15.5 | -10 | -12 | -14 | -1.5 | -3.25 | -5 |
| 157-1506-3 | -8 | -8 | -8 | -11.5 | -11.75 | -12 | 4 | 3.75 | 3.5 |
| 157-1506-3 | -7.5 | -7.5 | -7.5 | -25 | -25 | -25 | 17.5 | 17.5 | 17.5 |
| 157-1506-3 | -7 | -7 | -7 | -13.5 | -13.5 | -13.5 | 6.5 | 6.5 | 6.5 |

*FIG. 6*

| Reference Section | FALSE FLAG | AVG_delay | MAX_Pos_Delay | Max_Neg_delay | DT_MAX_REF_Eco | DT_AVG_REF_Eco | DT_MAX_REF_Eco | DT_MAX_NEIGH_Eco | DT_AVG_NEIGH_Eco |
|---|---|---|---|---|---|---|---|---|---|
| 157-1506-1 | | 3.83 | 39 | -18 | 0 | 0 | 0 | 0 | 0 |
| 157-1506-1 | | 0.17 | 109 | -26 | -5 | -11 | -17 | -4 | -7.75 |
| 157-1506-1 | | 2 | 22 | -22 | 0 | 0 | 0 | 0 | 0 |
| 157-1506-1 | | 42.75 | 34 | -29 | 0 | 0 | 0 | 0 | 0 |
| 157-1506-1 | | 3 | 48 | -23 | 0 | 0 | 0 | 0 | 0 |
| 157-1506-1 | | 0.33 | 23 | -8 | -3.5 | -3.5 | -3.5 | -13.5 | -13.5 |
| 157-1506-1 | | 28 | 70 | -3 | 0 | 0 | 0 | 0 | 0 |
| 157-1506-2 | | 10.95 | 37 | -5 | -5.5 | -5.5 | -5.5 | -12 | -13 |
| 157-1506-2 | | 19.56 | 25 | -30 | -5 | -5 | -5 | -13 | -13 |
| 157-1506-2 | | 19.6 | 32 | -12 | 0 | 0 | 0 | 0 | 0 |
| 157-1506-2 | | 0 | 12 | -45 | 0 | 0 | 0 | 0 | 0 |
| 157-1506-2 | | 10 | 58 | -30 | 0 | 0 | 0 | 0 | 0 |
| 157-1506-2 | | 0 | 30 | -4 | 0 | 0 | 0 | 0 | 0 |
| 157-1506-2 | | 8.5 | 41 | -19 | 0 | 0 | 0 | 0 | 0 |
| 157-1506-2 | | 15.5 | 56 | -82 | 0 | 0 | 0 | 0 | 0 |
| 157-1506-2 | | 18.5 | 37 | -33 | 0 | 0 | 0 | 0 | 0 |
| 157-1506-2 | | 8 | 49 | -105 | 0 | 0 | 0 | 0 | 0 |
| 157-1506-3 | | 12.28 | 18 | -21 | -11 | -13.25 | -15.5 | -9 | -10 |
| 157-1506-3 | | 6.88 | 47 | -3 | -7.5 | -7.5 | -7.5 | -14 | -14 |
| 157-1506-3 | | 0 | 3 | -15 | 0 | 0 | 0 | 0 | 0 |
| 157-1506-3 | | 18 | 72 | -23 | 0 | 0 | 0 | 0 | 0 |
| 157-1506-3 | | 44 | 80 | -10 | 0 | 0 | 0 | 0 | 0 |
| 157-1506-3 | | 32 | 27 | -17 | 0 | 0 | 0 | 0 | 0 |
| 157-1506-3 | | 0 | 49 | -40 | 0 | 0 | 0 | 0 | 0 |

*FIG. 7*

| Reference Sector | OT_MIN_NEIGH_Ecio | OT_MAX_REF_Ecio | OT_AVG_REF_Ecio | OT_MIN_REF_Ecio | OT_MAX_NEIGH_Ecio | OT_AVG_NEIGH_Ecio | OT_MIN_NEIGH_Ecio |
|---|---|---|---|---|---|---|---|
| 157-1506-1 | 0 | -4.5 | -7.75 | -10 | -6.5 | -11.5 | -16.5 |
| 157-1506-1 | -11.5 | -5 | -6.88 | -8.5 | -7 | -12.63 | -20 |
| 157-1506-1 | 0 | -7.5 | -8.4 | -10 | -12 | -13.7 | -15 |
| 157-1506-1 | 0 | -6 | -7.5 | -9 | -12 | -12.5 | -13 |
| 157-1506-1 | 0 | -7.5 | -8.33 | -10 | -13.5 | -13.83 | -14 |
| 157-1506-1 | -13.5 | -5 | -6.75 | -8.5 | -6.5 | -9.25 | -12 |
| 157-1506-1 | 0 | -8.5 | -8.5 | -8.5 | -12.5 | -12.5 | -12.5 |
| 157-1506-2 | -14 | -3 | -7.1 | -16 | -7.5 | -15.48 | -22 |
| 157-1506-2 | -13 | -3 | -6.95 | -16 | -10.5 | -17.12 | -22 |
| 157-1506-2 | 0 | -4 | -5.8 | -10.5 | -12.5 | -15.5 | -19.5 |
| 157-1506-2 | 0 | -5 | -7.4 | -11.5 | -13 | -14.5 | -17 |
| 157-1506-2 | 0 | -10.5 | -10.75 | -11 | -16.5 | -16.5 | -16.5 |
| 157-1506-2 | 0 | -9.5 | -10.5 | -11.5 | -5 | -6 | -7 |
| 157-1506-2 | 0 | -6.5 | -8.75 | -11 | -14.5 | -14.75 | -15 |
| 157-1506-2 | 0 | -10.5 | -10.75 | -11 | -9.5 | -9.75 | -10 |
| 157-1506-2 | 0 | -10.5 | -10.75 | -11 | -14 | -14 | -14 |
| 157-1506-3 | 0 | -6.5 | -6.5 | -6.5 | -20.5 | -20.5 | -20.5 |
| 157-1506-3 | -11 | -6 | -9.06 | -15.5 | -7.5 | -12.84 | -21 |
| 157-1506-3 | -14 | -6.5 | -8.93 | -12.5 | -11.5 | -16.17 | -26 |
| 157-1506-3 | 0 | -5 | -8.45 | -12.5 | -5.5 | -13.2 | -16.5 |
| 157-1506-3 | 0 | -15 | -15.25 | -15.5 | -10 | -12 | -14 |
| 157-1506-3 | 0 | -8 | -8 | -8 | -11.5 | -11.75 | -12 |
| 157-1506-3 | 0 | -7.5 | -7.5 | -7.5 | -25 | -25 | -25 |
| 157-1506-3 | 0 | -7 | -7 | -7 | -13.5 | -13.5 | -13.5 |

*FIG. 8*

| Reference Sector | 1=DT Edcr | 7=DT Edcr-6 | 9=DT Edcr-7 | 11=DT Edcr-9 | 13=DT Edcr-11 | 15=DT Edcr-13 | 16=DT Edcr-15 | 17=DT Edcr-16 | 19=DT Edcr-17 | 32=DT Edcr-19 | 33=DT Edcr-21 | DT Edcr-34 |
|---|---|---|---|---|---|---|---|---|---|---|---|---|
| 157-1506-1 | | | | | | | | | | | | |
| 157-1506-1 | 1 | | | | | | | | | | | |
| 157-1506-1 | | | | | | | | | | | | |
| 157-1506-1 | | | | | | | | | | | | |
| 157-1506-1 | | | | | | | | | | | | |
| 157-1506-1 | | | | | 1 | | 1 | | | | | |
| 157-1506-1 | | | | | | | 1 | | | | | |
| 157-1506-2 | | | | | 1 | | | | | | | |
| 157-1506-2 | | | | | 1 | | | | | | | |
| 157-1506-2 | | | | | | | | | | | | |
| 157-1506-2 | | | | | | | | | | | | |
| 157-1506-2 | | | | | | | | | | | | |
| 157-1506-2 | | | | | | | | | | | | |
| 157-1506-2 | | | | | | | | | | | | |
| 157-1506-2 | | | | | | | | | | | | |
| 157-1506-3 | | | | 1 | 1 | | | | | | | |
| 157-1506-3 | | | | | | | 1 | | | | | |
| 157-1506-3 | | | | | | | | | | | | |
| 157-1506-3 | | | | | | | | | | | | |
| 157-1506-3 | | | | | | | | | | | | |
| 157-1506-3 | | | | | | | | | | | | |
| 157-1506-3 | | | | | | | | | | | | |

FIG. 9

"EFFICIENT NEIGHBOR LIST CREATION FOR CELLULAR NETWORKS"

RELATED APPLICATIONS

This application is related to, and claims priority to U.S. Patent Application Ser. No. 60/986,852 filed on Nov. 9, 2007, entitled "Neighbor List Optimization," which application is herein incorporated by reference for all that it teaches without exclusion of any portion thereof.

TECHNICAL FIELD

This patent disclosure relates generally to cellular telephony and, more particularly to a method and system for creating and optimizing neighbor lists to facilitate efficient handoffs in a cellular network.

BACKGROUND

A cellular network is made up of a plurality of cellular towers or base stations, each of which serves a plurality of sectors, e.g., 3 separate 120 degree radial sectors per base station. As a particular mobile device moves from one location to another, it may close down contact with one sector and initiate contact with another sector, in such a way that the communications to and from the device are not disturbed. These sectors may or may not reside on a single base station. The process of transferring the responsibility for communications from one sector to another is referred to in the art as a "hand-off." The details of how to execute a hand-off are many and varied, however, for the purpose of this disclosure, it is notable that a hand-off is usually facilitated by a "neighbor list." A neighbor list is a table that associates each sector with its neighbor sectors. Neighbor sectors often include adjacent sectors, but may also include sectors that are not physically adjacent to one another.

If a new sector is not listed in the neighbor list of a particular sector, a hand off from that particular sector to the new sector is difficult or impossible in most cases, resulting in a dropped call or other communication disruption. Thus, great care is often taken to ensure that the neighbor lists are complete. Generally a drive test is executed to create and verify neighbor lists. The drive test involves personnel of the cellular operator physically driving within an area and watching a signal strength monitor to identify which sectors are strong enough in a given location to receive a hand off from a weakening sector. The drive test typically results in the creation of a new neighbor list for a sector or in the modification of an existing list to add or remove neighbors. While generally effective, this method of constructing neighbor lists is labor intensive and raises issues of liability and legality. For example, if operator personnel are involved in an accident while drive testing, the operator may be liable. In addition, in certain locations, it may not be legal to operate a cellular device while driving.

Various aspects of the disclosed principles can remedy these and other deficiencies, although it will be appreciated that the solution of the foregoing deficiencies is not an essential part of the invention. It will be further appreciated that the disclosed principles may be implemented without necessarily solving the above-noted deficiencies if so desired.

BRIEF SUMMARY OF THE INVENTION

The disclosure describes, in one aspect, a system and method for creating a neighbor list for use in hand-off decisions in a cellular network. In an embodiment of the invention, the process employs PSMM to derive potential neighbors. In a further embodiment of the invention, the process accounts for reciprocity and false positives to create reliable lists.

Other features and advantages of various embodiments of the invention will be appreciated from the specification including the drawings of which:

BRIEF DESCRIPTION OF THE DRAWINGS

FIG. 3 illustrates a modified neighbor list according to an embodiment of the invention;

FIG. 4 illustrates an example of the SWN.csv file contents according to an embodiment of the invention;

FIG. 5 illustrates an aspect of the NeighborList.csv according to an embodiment of the invention;

FIG. 6 illustrates a further aspect of the NeighborList.csv according to an embodiment of the invention;

FIG. 7 illustrates a further aspect of the NeighborList.csv according to an embodiment of the invention;

FIG. 8 illustrates a further aspect of the NeighborList.csv according to an embodiment of the invention;

FIG. 9 illustrates a further aspect of the NeighborList.csv according to an embodiment of the invention;

DETAILED DESCRIPTION

Figure 1:
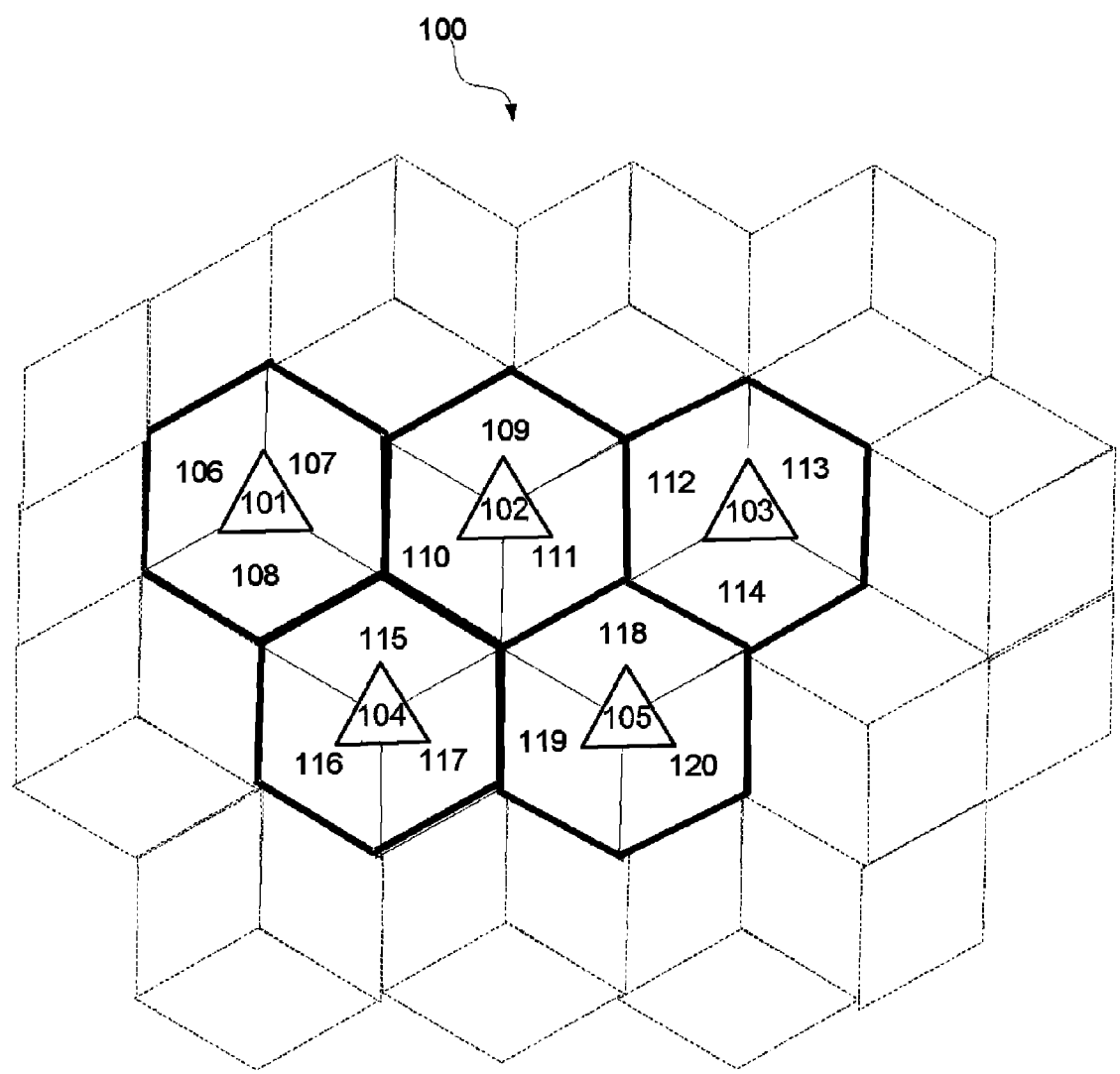
FIG. 1 is a schematic diagram of a generalized cellular environment including a number of base stations within which embodiments of the invention may be implemented.

The schematic diagram of FIG. 1 illustrates a generalized cellular environment 100. The generalized cellular environment 100 includes a number of base stations 101-105. As can be seen, the sectors of adjacent base stations are partially adjacent, in that each base station has one sector that shares a border with that of one sector of an adjacent base station. Thus, for example, base station 101 has sectors 106-108, base station 102 has sectors 109-111, base station 103 has sectors 112-114, base station 104 has sectors 115-117, and base station 105 has sectors 118-120. In the illustrated example, adjacent sector pairs include: [106,107], [107,108], [106,108], [109,110], [110,111], [109,111], [112,113], [113, 114], [112,114], [115,116], [116,117], [115,117], [118,119], [119,120], and [118,120]. In addition, adjacent sectors from adjacent base stations include [110,107], [115,108], [110, 115], [117,119], [111,112], [111,118], and [118, 114].

However, a handoff need not occur between adjacent sectors. For reasons of signal blockage, topology, etc. nonadjacent sectors may be neighbors depending upon the relative signal strengths. Similarly, adjacent sectors are not neighbors for all purposes in all cases. Thus, for a given sector, the nearby sectors to which a hand-off may occur are generally tracked via a neighbor list constructed via drive testing as discussed above, or constructed via the disclosed principles for improved and more efficient list creation.

Figure 2:
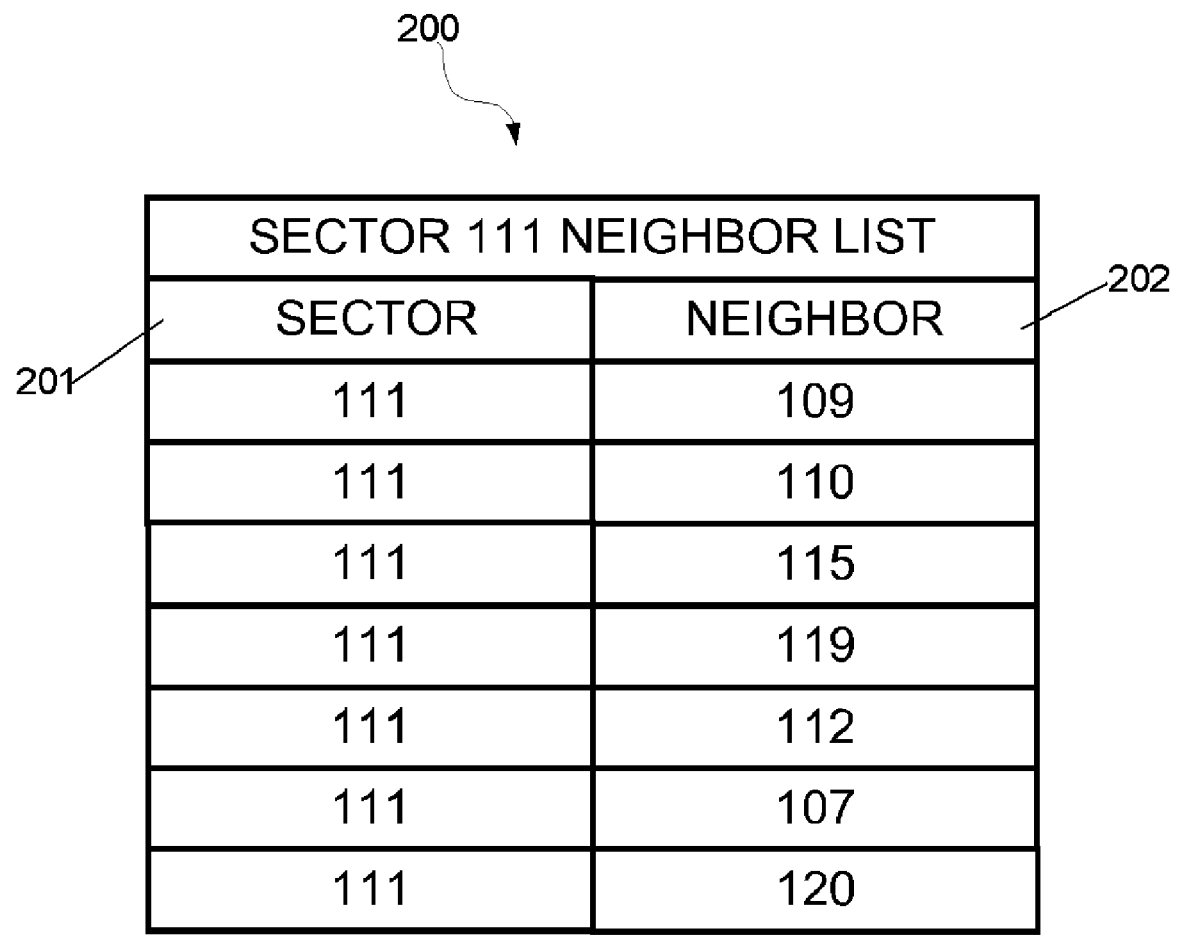
FIG. 2 illustrates a neighbor list according to an embodiment of the invention.

The chart of FIG. 2 illustrates a possible neighborlist 200 for sector 111 of FIG. 1. As can be seen, the list 200 includes a sector field 201 and a neighbor field 202. From the neighbor field 202, it can be seen that the neighbors of sector 111 include a number of the adjacent sectors, but not all adjacent sectors. In addition, the neighbors of sector 111 also include a number of nonadjacent sectors for the reasons discussed above. When a mobile device being serviced by sector 111 starts to experience a weak signal in that sector, the device is handed off to a neighbor sector based on the neighbor list 200. If no neighbor is available for hand-off, i.e., when there is insufficient signal strength from all of the listed neighbors to successfully hand off the device communications, the communication may be dropped or disrupted when the signal strength from sector 111 drops below a minimum level. Therefore, it is important that the neighbor list for all sectors be current and accurate.

As noted above, it is traditionally known only to construct neighbor lists via drive testing and similar methods. However, in an embodiment of the invention, PSMM data provided by individual mobile units is centrally collected and correlated to provide an accurate listing of viable neighbors for each sector. As each mobile unit moves within the cellular system 100, it monitors the signal strength that it observes from sectors that it can detect. Thus, a unit that is centrally located in sector 111 would detect a high signal strength from sector 111, but may also detect substantial respective signal strengths from sector 118 and from sector 112. This data is transmitted to the base station 102 and from there to a controller in an embodiment of the invention.

In an embodiment of the invention, the signal strength data is derived from the data contained in a standard Pilot Strength Measurement Message (PSMM) transmission. The PSMM contains a pilot strength record for each sector from which the mobile device is receiving a signal of non-negligible strength. Each pilot strength record contains a number of fields, but of particular interest here is the PILOT_STRENGTH field. The PILOT_STRENGTH field can be used to compute the strength of a received pilot by measuring the ratio of the pilot energy to the total received spectral density (including noise and signal) at the current CDMA frequency. In general, pilot strength may be reported in units of −0.5 dB, however any other suitable measurement standard and increment may be used as desired.

The PSMM transmission may indicate that a sector not listed in the neighbor list for the current sector nonetheless has an acceptable signal strength within the current sector. In this case, in an embodiment of the invention, the controller modifies the neighbor list for the current sector to list the new sector as a neighbor for purposes of hand-off. Similarly, the PSMM transmission may indicate that a sector listed in the neighbor list for the current sector nonetheless has an unacceptable signal strength within the current sector. In this case, in an embodiment of the invention, the controller modifies the neighbor list for the current sector to delist the identified sector for purposes of hand-off.

Figure 3:
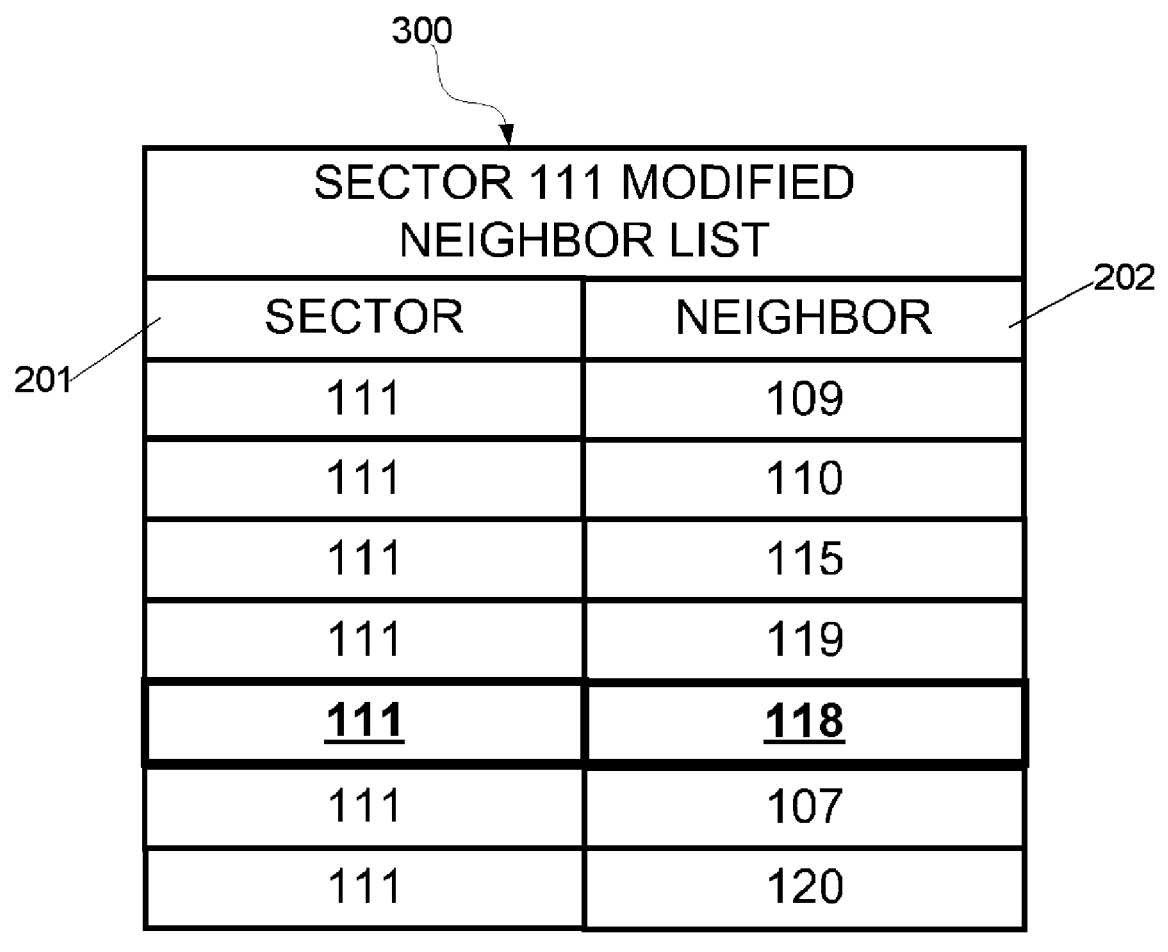

Thus, in a specific example, consider the case wherein a PSMM transmission from the mobile device in communication with sector 111 indicates that sector 118 has an acceptable signal strength within the current sector and sector 112 has an unacceptable signal strength within the current sector. In this case, the neighbor list 200 is modified to include sector 118 and to exclude sector 112 as shown in the modified neighbor list 300 of FIG. 3.

In an embodiment of the invention, the PSMM analysis and neighbor list correction is performed by a Perl script, although any other language or programmatic representation, whether compiled code or script, may be used. The script operates on an NLTA SBS log in an embodiment of the invention to derive a provisional listing which is then processed to derive a final listing. In an embodiment of the invention, The output of the script are seven separate files including: (1) SWN.csv containing the histograms of the delays for each particular search window size and the recommended SWN value based on a 98% percentile (the user may modiy this threshold); (2) NeighborList.csv containing the sorted neighbor lists and statistics for each sector-carrier in the network based on Occurences (HO matrix); (3) Recommended_NLIST.csv containing the recommended NLIST for each sector-carrier; (4) Recommended_ENLIST.csv containing the recommended ENLIST for each sector-carrier; (5) Warnings.txt (NEW) contains any warnings, e.g., list of sector-carriers with no PSMM data as reference sectors (These sectors can be present on other PSMMs but they never were reference sectors. Usually they are Pilot Beacons.), list of sectors Co—PN, list of sectors with duplicate PN neighbors in the NL and list of sectors with low count of PSMM data; (6) METROBTSscript.txt contains all sector-carriers in the network assuming all of them as METROBTS with their corresponding NLIST and ENLIST for CACP; and (7) LOGICAL-BTSscript.txt contains all sector-carriers in the network assuming all of them as LOGICALBTS with their corresponding NLIST for CACP.

The chart 400 of FIG. 4 illustrates an example of the SWN.csv. In this example, the Recommended_SWN is the recommended SWN value based on the 99% percentile threshold. (99% of delays fell under the recommended SW size). The SW0.SW15 represents the number of occurrences a delay value falls into the particular search window size when the particular freq-site-sector combination was the reference. These data can be used to create histograms for more detailed analysis. The Total Count is the number of records considered for the particular freq-site-sector reference.

FIGS. 5-9 (broken up for ease reading) illustrate the NeighborList.csv in an example, wherein the fields are defined as follows:

1) Reference Sector: the reference sector in the PSMM
2) PN REF: the reference sector's PN
3) Neighbor: Neighboring sector requested in a PSMM
4) PN NEIGH: the neighbor's PN
5) Ocurrences: the number of times a particular reference-neighbor combination was presented in a PSMM.
6) Ocurrences %: the percentage of occurrences.
7) DirectTransitions: the number of times the reference and neighbor sectors were the only pilots in a PSMM (2-way request).
8) Recip_Occur: the number of occurrences of the reciprocal direction
9) Recip_Occur %: the percentage of occurrences in the reciprocal direction
10) Reciprocal_Directrans: Reciprocal Direct Transitions.
11) MAX_REF_EcIo: the maximum value of Ec/Io of the reference sector
12) AVG_REF_EcIo: the average value of Ec/Io of the reference sector
13) MIN_REF_EcIo: the minimun value of Ec/Io of the reference sector
14) MAX_NEIGH_EcIo: the maximum value of Ec/Io of the neighbor sector
15) AVG_NEIGH_EcIo: the average value of Ec/lo of the neighbor sector
16) MIN_NEIGH_EcIo: the minimun value of Ec/lo of the neighbor sector
17) MAX_delta_ECIO: maximum value for Ec/Io_reference−Ec/Io_neighbor
18) AVG_delta_ECIO: average value for Ec/Io_reference−Ec/Io_neighbor 19) MIN_delta_ECIO: minimum value for Ec/Io_reference−Ec/Io_neighbor 20) FALSE_FLAG: when an adjacent false PN is detected, the particular pair is flagged in this column.

21) AVG delay: the average neighbor's delay in chips between the reference and neighbor sector 22) MAX_Pos_Delay: Maximum Positive delay reported for that particular neighbor 23) MAX_Neg_Delay: Maximum Negative delay reported for that particular neighbor 24) MAX_delay: the maximum neighbor's delay in chips between the reference and neighbor sector 25) DT_MAX_REF_EcIo: the maximum value of Ec/Io of the reference sector during Direct Transitions.

26) DT_AVG_REF_EcIo: the average value of Ec/Io of the reference sector during Direct Transitions.

27) DT_MIN_REF_EcIo: the minimun value of Ec/Io of the reference sector during Direct Transitions.

28) DT_MAX_NEIGH_EcIo: the maximum value of Ec/Io of the neighbor sector during Direct Transitions.

29) DT_AVG_NEIGH_EcIo: the average value of Ec/Io of the neighbor sector during Direct Transitions.

30) DT_MIN_NEIGH_EcIo: the minimun value of Ec/Io of the neighbor sector during Direct Transitions.

31) OT_MAX_REF_EcIo: the maximum value of Ec/Io of the reference sector during Other Transitions (Every other PSMM except direct transitions).

32) OT_AVG_REF_EcIo: the average value of Ec/Io of the reference sector during Other Transitions (Every other PSMM except direct transitions).

33) OT_MIN_REF_EcIo: the minimun value of Ec/Io of the reference sector during Other Transitions (Every other PSMM except direct transitions).

34) OT_MAX_NEIGH_EcIo: the maximum value of Ec/Io of the neighbor sector during Other Transitions (Every other PSMM except direct transitions).

35) OT_AVG_NEIGH_EcIo: the average value of Ec/Io of the neighbor sector during Other Transitions (Every other PSMM except direct transitions).

36) OT_MIN_NEIGH_EcIo: the minimun value of Ec/Io of the neighbor sector during Other Transitions (Every other PSMM except direct transitions); and 37) Neighbor_EcIo_DT: this is an array of EcIo values (histogram) for the neighbor during Direct Transitions only. It is useful to investigate and qualify the importance of the direct transitions together with the DT and OT statistics.

The Warnings.txt file contains warnings from the tool as discussed above. Example warnings include a list of sectors that do not have any PSMM as a reference sector. These sectors might be present in a PSMM but they never were reference sectors. Usually, these sectors are Pilot Beacons and they will not have a recommended neighbor list. In an embodiment of the invention, the script may assume that all these sectors are Pilot beacons and skip them. As another example, the Warnings.txt file may include a list of Co—PN neighbors with the reference sector. These are very rare events and might indicate Co—PN issues in the network. As another example, the Warnings.txt file may include a list of neighbors for the same reference sector that have duplicate PN. These events not necessarily mean a problem but a possible Co—PN issue. It is generated when multiples mobiles (usually in opposite areas with respect to the Reference sector) report the same PN (coming from different sites) in the PSMM.

The METROBTSscript.txt file contains the recommended neighbor list. The file follows the format for a METROBTS cell type according to CACP and in an embodiment of the invention is completed with all the sites presented in the log files assuming all of them are METROBTS even if they are not. The user may delete entries that are Logical Sectors in the file to get the file ready to import.

The LOGICALBTSscript.txt file contains the recommended neighbor list and follows the format for a LOGICALBTS cell type according to CACP and in an embodiment may be completed with all the sites presented in the log files assuming all of them are LOGICALBTS even if they are not. The user may then delete the entries that are real MetroCell Sectors in the file to get the file ready to import.

In an embodiment of the invention, the script or other process identifies Adjacent PN false detection. In particular, when a PN is reported by the mobile in a PSMM with a delay larger than the value of PILOT_INC*32 chips, the BSC decodes it as a false PN with an opposite sign delay value.

In an embodiment of the invention a neighbor list algorithm creates recommended neighbor list files and associated CACP files. A Settings.ini file include flags to enable a reciprocity check on the NLIST or ENLIST (CDMANLIST for NBSS14) independently. These flags will affect the NL size. Enabling reciprocity will typically result in a higher NL size than when the flag is not activated. The neighbor list algorithm first calculates the occurrences and percentage of occurrences for each reference-neighbor pair in the network and then sorts them in descending order based on occurrences, to generate a combined sorted list for the whole network and not for a particular sector-carrier.

The algorithm then adds softer handoff sectors to each reference's NL and then goes through the sorted list building the neighbor lists of all sector-carriers in quasi-parallel fashion.

This approach addresses a problem that could occur if the algorithm were to treat individual NL one at a time and include reciprocity check. In particular, by building one specific NL first, the reciprocity check tends to fill out some reciprocal neighbors that might not be as important as other neighbors in the reciprocal's NL, and if the site reach the limit e.g., 20 neighbors, it is likely to omit important neighbors with high number of occurrences. Thus, by sorting all neighbors in the network by occurrences, the tool does the ranking automatically and solve this multiple interaction problem.

Figure 10:
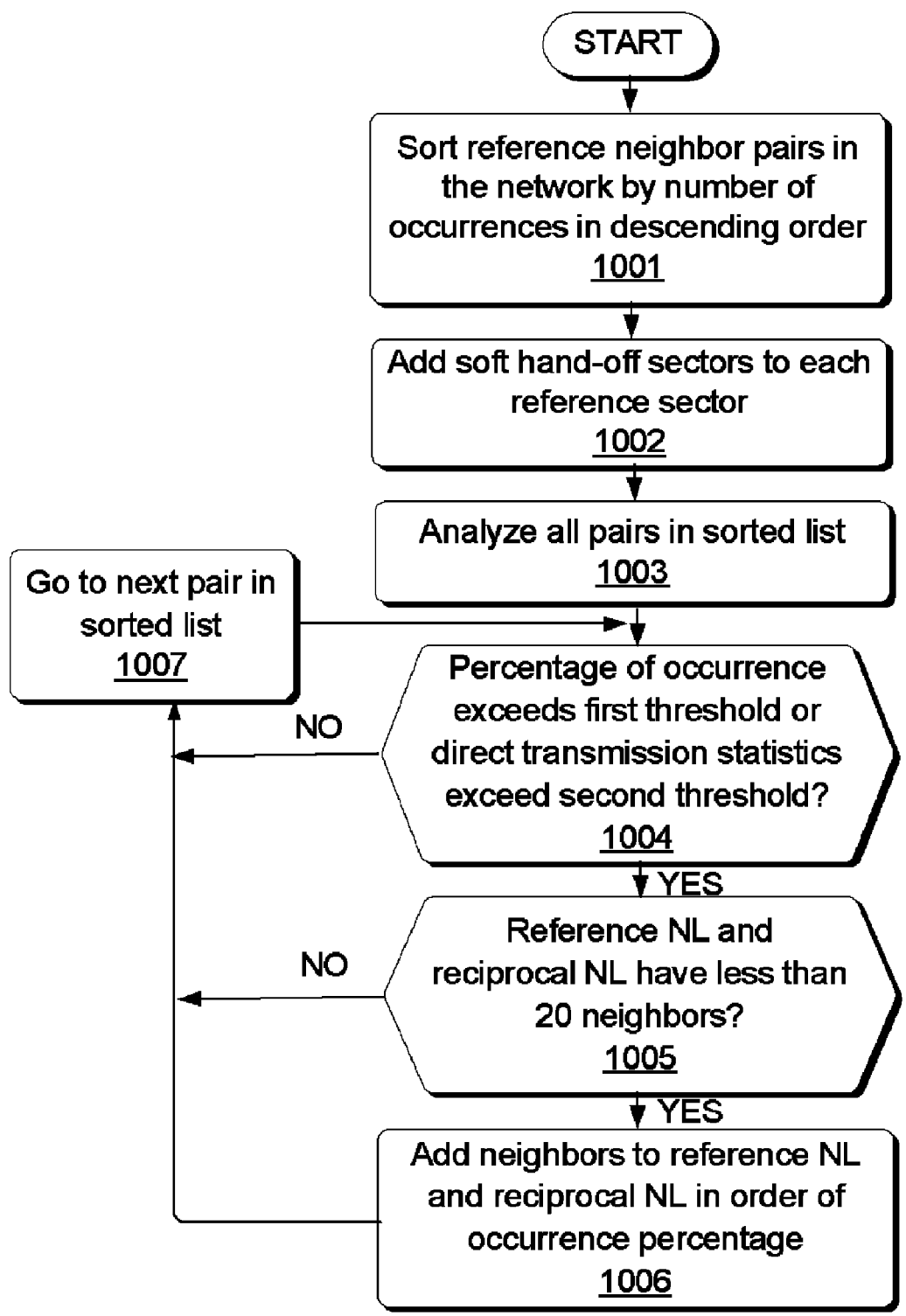
FIG. 10 is a flow chart illustrating a process of constructing a neighbor list according to an embodiment of the invention.

FIG. 10 is a flow chart 1000 illustrating a process of constructing a neighbor list according to an embodiment of the invention, wherein a reciprocity check is employed. At stage 1001, the process sorts all reference neighbor pairs in the network by number of occurrences in descending order. In an embodiment of the invention, the sorting is global rather than a sector-carrier based sort action. The process then adds softer hand-off sectors to each reference sector at stage 1002. At stage 1003, the process analyzes all pairs in the sorted list. In particular, at stage 1004, the process determines for a given pair whether the percentage of occurrence exceeds a first threshold or whether the direct transition statistics (defined above, as "Direct Transitions") exceeds a second threshold.

If the answer to both inquiries is affirmative, then the process flows to stage 1005, whereupon the process determines whether the reference's NL and reciprocal NL have less than 20 neighbors (or any other chosen size). If it is determined that both lists have less than 20 neighbors, then the process flows to stage 1006, and adds neighbors to the reference's NL and reciprocal NL in order of occurrence percentage. If either of stages 1003 or 1004 yields a negative determination, then the process flows instead to stage 1007 where it increments to the next pair in the list of stage 1002.

Figure 11:
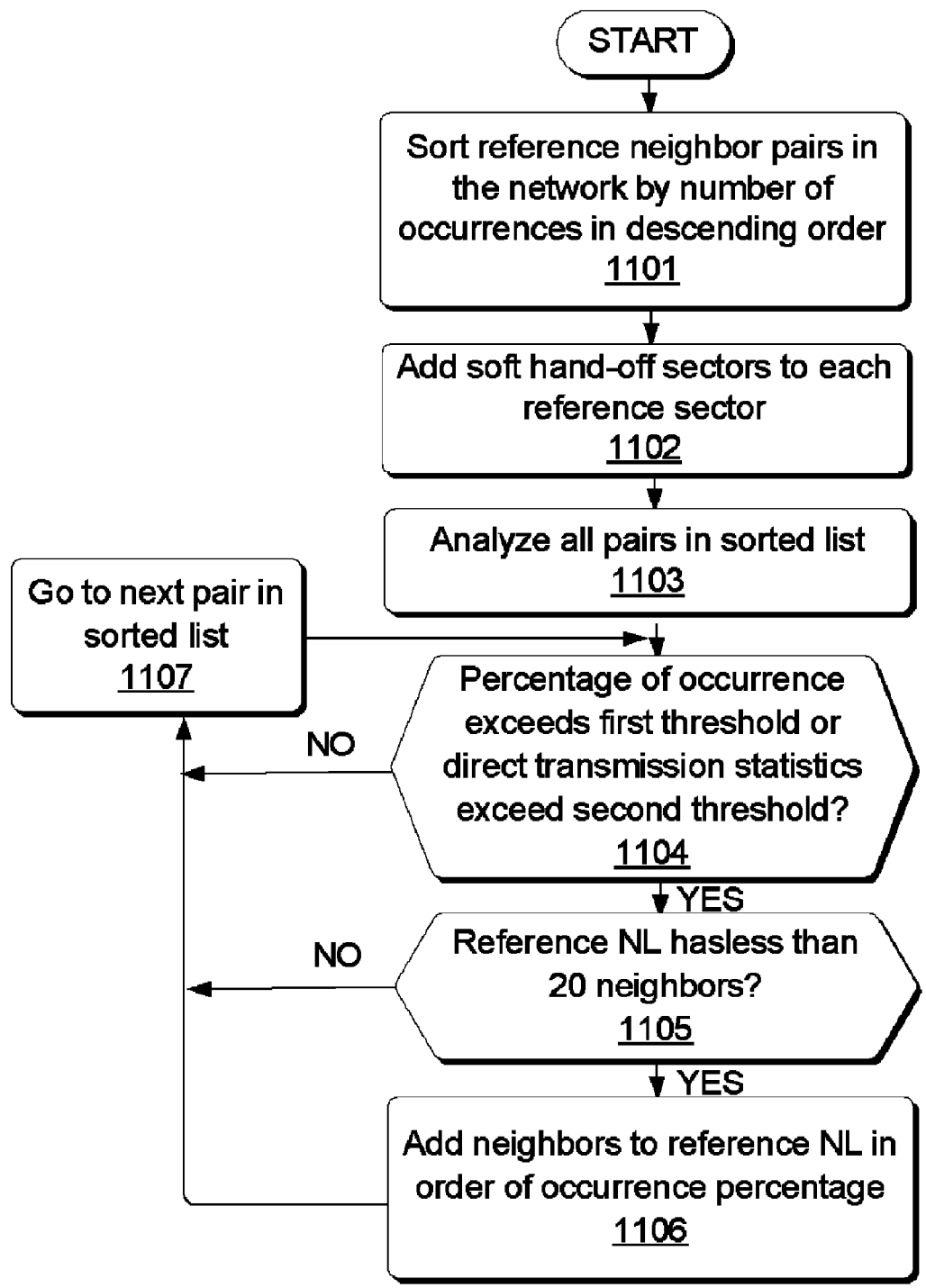
FIG. 11 is a flow chart illustrating an alternative process of constructing a neighbor list according to an embodiment of the invention

FIG. 11 is a flow chart 1100 illustrating a process of constructing a neighbor list according to an embodiment of the invention, wherein a reciprocity check is not employed. At stage 1101, the process sorts all reference neighbor pairs in the network by number of occurrences in descending order. In an embodiment of the invention, the sorting is global rather than a sector-carrier based sort action. The process then adds softer hand-off sectors to each reference sector at stage 1102. At stage 1103, the process analyzes all pairs in the sorted list. In particular, at stage 1104, the process determines for a given pair whether the percentage of occurrence exceeds a first threshold or whether the direct transition statistics (defined above, as "Direct Transitions") exceeds a second threshold.

If the answer to both inquiries is affirmative, then the process flows to stage 1105, whereupon the process determines whether the reference NL has less than 20 neighbors (or any other chosen size). If it is determined that the reference NL has less than 20 neighbors, then the process flows to stage 1106, and adds neighbors to the reference NL in order of occurrence percentage. If either of stages 1103 or 1104 yields a negative determination, then the process flows instead to stage 1107 where it increments to the next pair in the list of stage 1102.

It will be appreciated that the foregoing description provides examples of the disclosed system and technique. However, it is contemplated that other implementations of the disclosure may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of constructing a neighbor list associated with a plurality of sectors in a cellular communication environment the method comprising:
    sorting reference neighbor pairs in a network by a number of occurrences so as to create a sorted list;
    adding softer hand-off sectors to each reference sector within the plurality of sectors;
    analyzing pairs in the sorted list and determining for each pair whether a percentage of occurrence exceeds a first threshold and whether a measure of direct transition statistics exceeds a second threshold; and
    if the percentage of occurrence exceeds the first threshold and the measure of direct transition statistics exceeds the second threshold, then determining whether a reference neighbor list and a reciprocal neighbor list have fewer than a predetermined number of neighbors and if so, adding neighbors to the reference neighbor list and the reciprocal neighbor list in order of occurrence percentage so as to create a final neighbor list.

2. The method according to claim 1, wherein sorting reference neighbor pairs in the network by number of occurrences comprises sorting reference neighbor pairs in descending order.

3. The method according to claim 1, wherein sorting reference neighbor pairs in the network by number of occurrences comprises sorting reference neighbor pairs globally.

4. The method according to claim 1, wherein the final neighbor list includes neighbors that are physically adjacent.

5. The method according to claim 4, wherein the final neighbor list further includes neighbors that are physically nonadjacent.

6. The method according to claim 1, wherein the final neighbor list includes at least a plurality of neighbors that are associated with a single base station.

7. The method according to claim 1, wherein the final neighbor list includes a list of one or more reference sectors associated with respective neighbor sectors.

8. The method according to claim 1, wherein data related to reference neighbor pairs usable to identify pairs and their frequency of occurrence of pairs is derived from a plurality of PSMM transmissions received from one or more mobile devices.

9. The method according to claim 8, wherein each PSMM transmission includes signal strength data in the form of a pilot strength record for each sector from which the mobile device is receiving a substantial signal.

10. The method according to claim 9, wherein each pilot strength record includes a PILOT_STRENGTH field that is used to compute the strength of a received pilot by measuring the ratio of the pilot energy to the total received spectral density.

11. A non-transitory computer-readable medium having thereon computer-executable instructions for constructing a neighbor list associated with a plurality of sectors in a cellular communication environment, the instructions comprising:
    instructions for sorting reference neighbor pairs in a network by a number of occurrences so as to create a sorted list;
    instructions for adding softer hand-off sectors to each reference sector within the plurality of sectors;
    instructions for analyzing pairs in the sorted list and determining for each pair whether a percentage of occurrence exceeds a first threshold and whether a measure of direct transition statistics exceeds a second threshold; and
    instructions for determining whether a reference neighbor list and a reciprocal neighbor list have fewer than a predetermined number of neighbors and if so, adding neighbors to the reference neighbor list and the reciprocal neighbor list in order of occurrence percentage so as to create a final neighbor list if the percentage of occurrence exceeds the first threshold and the measure of direct transition statistics exceeds the second threshold.

12. The computer-readable medium according to claim 11, wherein the computer-executable instructions for sorting reference neighbor pairs in the network by number of occurrences comprise instructions for sorting reference neighbor pairs in descending order.

13. The computer-readable medium according to claim 11, wherein the computer-executable instructions for sorting reference neighbor pairs in the network by number of occurrences comprise instructions for sorting reference neighbor pairs globally.

14. The computer-readable medium according to claim 11, wherein the final neighbor list includes neighbors that are physically adjacent.

15. The computer-readable medium according to claim 14, wherein the final neighbor list further includes neighbors that are physically nonadjacent.

16. The computer-readable medium according to claim 11, wherein the final neighbor list includes at least a plurality of neighbors that are associated with a single base station.

17. The computer-readable medium according to claim 11, wherein the final neighbor list includes a list of one or more reference sectors associated with respective neighbor sectors.

18. The computer-readable medium according to claim 11, wherein data related to reference neighbor pairs usable to identify pairs and their frequency of occurrence of pairs is derived from a plurality of PSMM transmissions received from one or more mobile devices.

19. The computer-readable medium according to claim 18, wherein each PSMM transmission includes signal strength data in the form of a pilot strength record for each sector from which the mobile device is receiving a substantial signal.

20. The computer-readable medium according to claim 19, wherein each pilot strength record includes a PILOT_STRENGTH field that is used to compute the strength of a received pilot by measuring the ratio of the pilot energy to the total received spectral density.

* * * * *

UNITED STATES PATENT AND TRADEMARK OFFICE
CERTIFICATE OF CORRECTION

| | | |
|---|---|---|
| PATENT NO. | : 8,086,237 B2 | Page 1 of 1 |
| APPLICATION NO. | : 11/968023 | |
| DATED | : December 27, 2011 | |
| INVENTOR(S) | : Mario Vela, Narothum Saxena and Michael Irizarry | |

It is certified that error appears in the above-identified patent and that said Letters Patent is hereby corrected as shown below:

On the Title page, item (60) should read,

"Related U.S. Application Data

(60) Provisional Application No. 60/986,852, filed on November 9, 2007."

Signed and Sealed this
Fourteenth Day of February, 2012

David J. Kappos
*Director of the United States Patent and Trademark Office*